March 12, 1935. D. E. AUSTIN 1,993,912
VEHICLE MOTOR AND REAR AXLE CONNECTION
Filed July 25, 1932  2 Sheets-Sheet 1
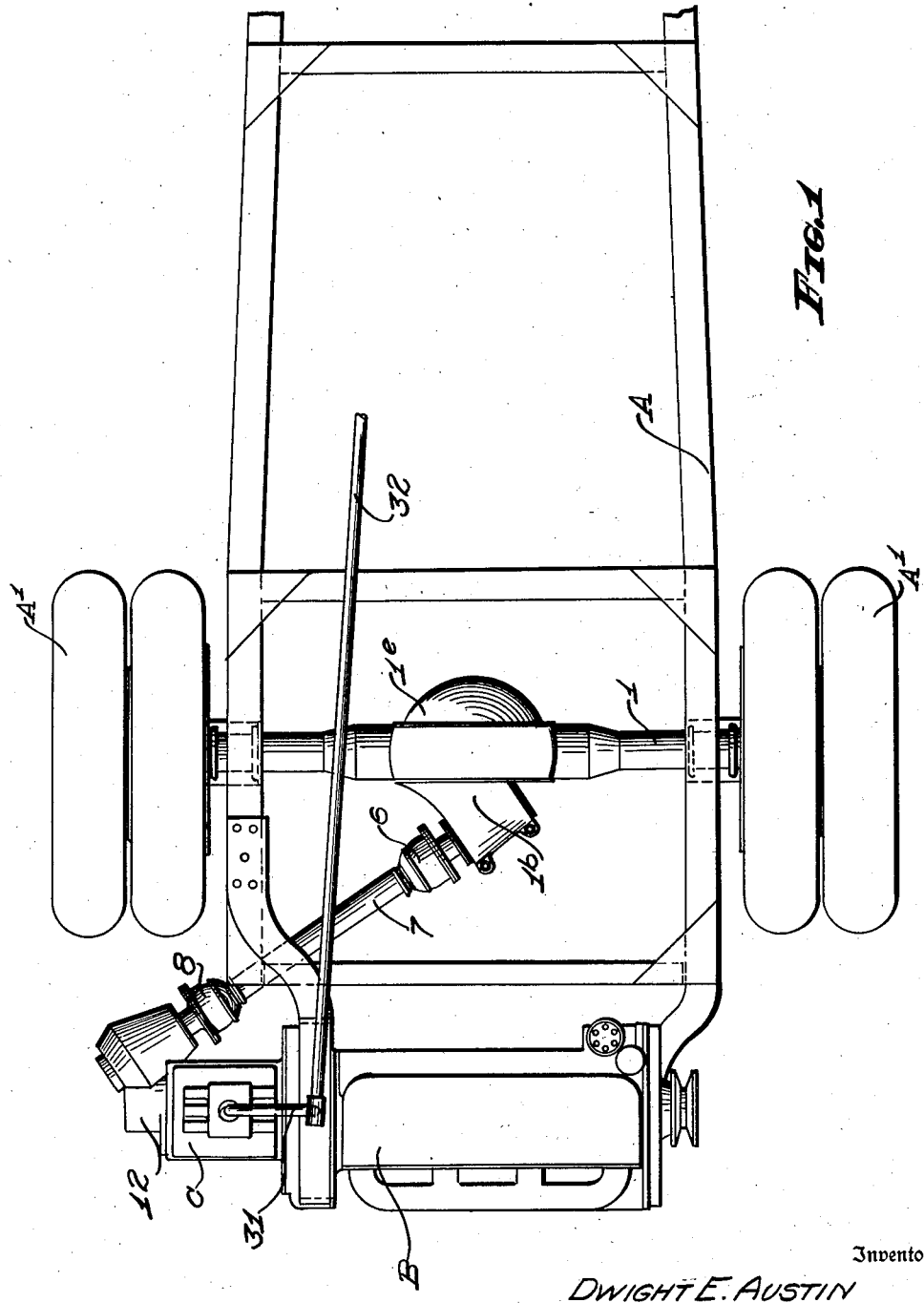
Inventor
DWIGHT E. AUSTIN
By A. B. Bowman
Attorney March 12, 1935.  D. E. AUSTIN  1,993,912
VEHICLE MOTOR AND REAR AXLE CONNECTION
Filed July 25, 1932   2 Sheets-Sheet 2
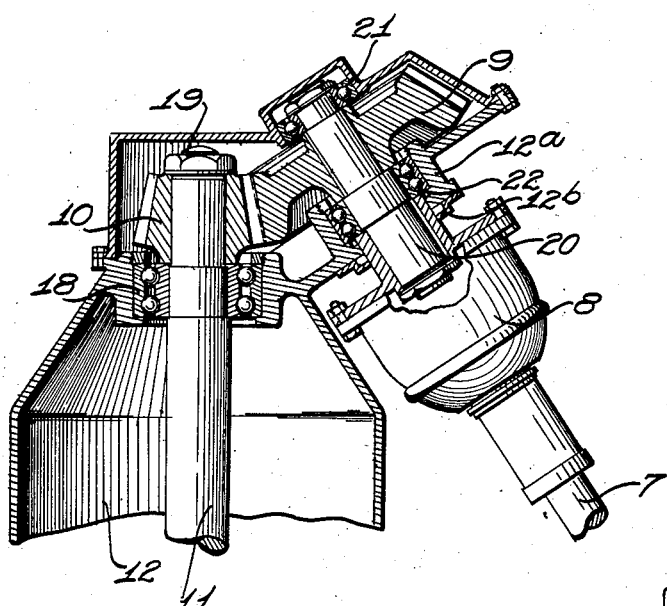
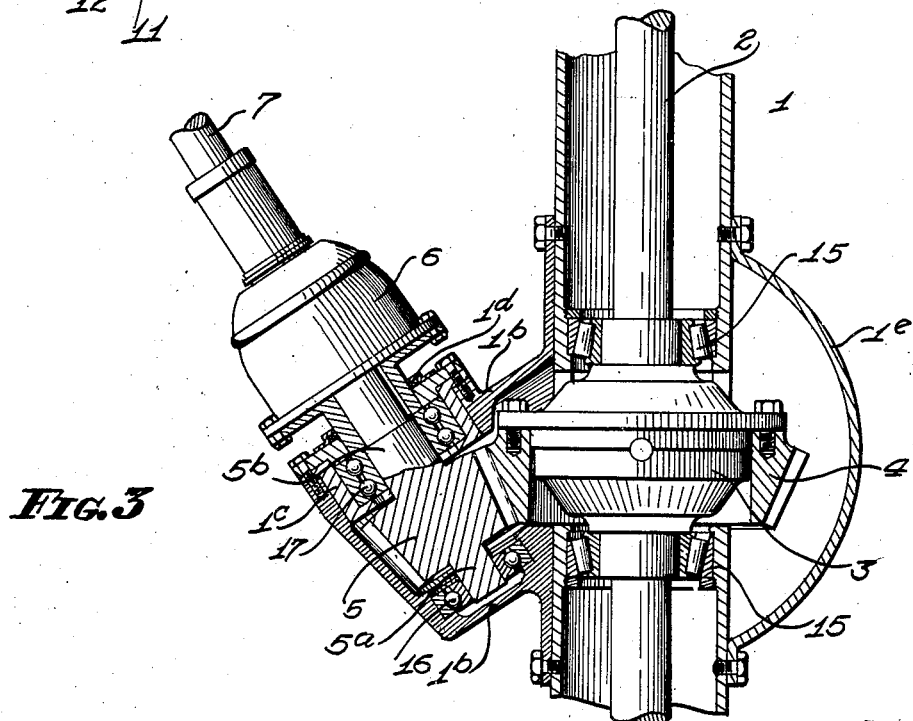
Inventor
DWIGHT E. AUSTIN
By A. B. Bowman
Attorney Patented Mar. 12, 1935

1,993,912

UNITED STATES PATENT OFFICE 1,993,912

VEHICLE MOTOR AND REAR AXLE CONNECTION

Dwight E. Austin, Inglewood, Calif., assignor, by mesne assignments, to General Motors Truck Corporation, Pontiac, Mich., a corporation of Delaware Application July 25, 1932, Serial No. 624,462

9 Claims. (Cl. 180—70)

My invention relates to vehicle motor and axle connection, more particularly to such connection in which the motor is mounted transversely to the vehicle, and the objects of my invention are:

First, to provide a device of this class in which the motor is mounted transversely to the longitudinal axis of the vehicle;

Second, to provide a device of this class in which the motor is mounted in close proximity with the axle and with its axis parallel thereto;

Third, to provide a device of this class in which ample flexibility of connection is provided when the motor is mounted in close proximity and parallel to the axle driven thereby;

Fourth, to provide a device of this class in which the motor is connected to its driven axle through bevel gears;

Fifth, to provide a device of this class in which the motor may be mounted on either side of the axle driven thereby;

Sixth, to provide a device of this class in which a standard transmission gear may be used in combination with the motor mounted parallel to the axle to be driven thereby; and Seventh, to provide a device of this class that is simple of construction, durable, efficient in its action and which will not readily deteriorate or get out of order.

With these and other objects in view as will appear hereinafter, my invention consist of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a fragmentary plan view of a vehicle chassis showing the mounting of the motor and connection thereof to the drive axle;

Fig. 2 is a sectional plan view of the gearing mechanism connected with the motor and Fig. 3 is a sectional plan view of the gearing mechanism connecting with the differential and axle.

Similar characters of reference refer to similar parts and portions throughout the several views of the drawings.

Vehicle chassis A, motor B, axle housing 1, rear axle 2, differential mechanism 3, bevel ring gear 4, bevel gear pinion 5, universal joint 6, propeller shaft 7, universal joint 8, bevel gear 9, bevel pinion gear 10, transmission shaft 11, and transmission casing 12 constitute the principal parts and portions of my vehicle motor and axle connection.

The rear axle housing 1 extends transversely to and carries through suitable springs the chassis A, as in conventional design and supports the wheels A1 at the outer ends thereof. The drive axle 2 comprising a pair of shafts arranged end to end is rotatably supported within the housing 1 at the center thereof by means of the roller bearings 15, the axially inner ends of the axle 2 terminating in the differential 3 which is of conventional construction. Rigidly supported upon the differential 3 is the ring gear 4 which is in the form of a bevel gear and may be either straight toothed or spiral toothed.

Mounted upon the housing 1 is a cover 1b which supports the bevel pinion gear 5 in operative relation with the ring gear 4 by means of the ball bearings 16 and 17, and at an angle of approximately 34 degrees with the axle 2.

The pinion 5 is formed at one side with an integral shaft portion 5a entering into and rotatably supported by the ball bearing 16 and at the opposite side with a shaft 5b rotatably supported by the ball bearing 17. The extended end of the shaft 5b extends into and supports the universal joint 6. The ball bearing 17 is carried by a cylindrical casing 1c fitted into the casing 1b and secured thereto, the joint around the shaft 5b being sealed by means of packing 1d. The universal joint 6 is of conventional construction employed in vehicle drive. The side of the housing opposite that covered by the cover 1b is covered by means of a spherical cover 1e.

The motor B is of conventional design and is provided with a transmission C, also of conventional design. The transmission C contains the necessary gearing for obtaining various speed ratios and is operated through the arm 31 and rod 32, as shown in Fig. 1. The motor B and the transmission C are mounted transversely of the longitudinal axis of the chassis A and in this instance backwardly of the rear axle 2, which is driven thereby. The transmission shaft 11 is rotatably supported within the casing 12 by means of the ball bearing 18. The extended end of the shaft 11 is of slightly reduced diameter and mounted upon this reduced portion of the shaft 11 is a bevel pinion gear 10 secured thereon by means of the nut 19. The casing 12 is provided with a side casing 12a formed integral therewith, which rotatably supports the bevel gear 9 in operative engagement with the bevel pinion gear 10, the beveled gear being supported upon a shaft 20 rotatably carried by the ball bearings 21 and 22, the shaft 20 making an angle of approximately 34 degrees with the shaft 11.

One side of the universal joint 8 is non-rotatably supported upon the end of the shaft 20, the joint around the shaft 20 being sealed by means of the packing 12b, while the other side thereof connects with the propeller shaft 7, which shaft extends diagonally across the chassis A and operatively connects with the universal joint 6. It is thus seen that the motor B is operatively connected to the rear axle 2, which drives the wheels A1, through the transmission C, bevel gears 9 and 10, universal joint 8, propeller shaft 7, universal joint 6, bevel gear 5 and ring gear 4.

It is noted that in the preceding description of my vehicle motor and axle connection, the motor is positioned backwardly of the rear axle but the motor need not necessarily be so positioned. The motor may be positioned forwardly of the rear axle or the drive may be employed in connection with front wheel drives in which case the motor may be positioned either forwardly or backwardly of the front axle as desired.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In combination with a vehicle, a motor and drive axle mounted thereon, said motor and axle being positioned transversely to the longitudinal axis of said vehicle, a differential gear mechanism mounted upon said drive axle, a bevel ring gear mounted on said differential, a bevel gear mounted in operative engagement with said bevel ring gear, a universal joint rigidly connected with said bevel gear, a transmission having a shaft extending therefrom in association with said motor, a bevel pinion gear mounted on the shaft of said transmission, a second bevel gear mounted in engagement with said bevel pinion gear, a second universal joint rigidly connected with said second bevel gear and a propeller shaft operatively connecting said universal joints, said propeller shaft extending diagonally across the chassis of the vehicle.

2. The combination with a vehicle and drive wheels therefor connected by a drive axle structure, of a differential unit interposed in said drive axle structure at its central portion, a motor including a drive shaft disposed in parallel relation with said drive axle structure, a transmission in axial relation with said drive shaft terminating radially from one of said drive wheels, and a diagonally disposed drive means extending from said differential unit to said transmission and clearing the periphery of said drive wheel.

3. The combination with a vehicle chassis having a transversely disposed driving axle structure and drive wheels at the extremities thereof of a differential unit interposed in said driving axle structure, a motor including a drive shaft disposed transversely of said vehicle chassis and in parallel relation with said driving axle structure, a transmission connected to said drive shaft at one end, said transmission and differential unit disposed in laterally offset relation with respect to each other, and a diagonally disposed drive means including bevel gear elements at its extremities for co-action with said differential unit and said transmission respectively.

4. In a power transmitting mechanism for vehicle drive wheels, a vehicle chassis, a drive axle structure protruding laterally beyond said vehicle chassis, drive wheels at the extremities of said drive axial structure, a differential unit interposed in said drive axle structure, a motor supported by said vehicle chassis at an extremity thereof including a drive shaft, a transmission connected to an end of said drive shaft and projecting laterally beyond said vehicle chassis, said transmission and differential unit being in laterally offset relation, and a driving means including a diagonally disposed shaft extending across one side of said vehicle chassis and gear elements at its extremities operatively connecting said differential unit and said transmission.

5. The combination with a driving axle structure and wheels at its extremities and a vehicle chassis yieldably supported from said driving axle structure of a differential unit interposed in said driving axle structure, a motor supported by said vehicle chassis in longitudinally offset relation with respect to said driving axle structure and including a drive shaft extending in parallel relation with said driving axle structure, a transmission joined to said drive shaft, gear drive units connected with said differential unit and said transmission, said gear drive units disposed in laterally offset relation with each other, and a diagonally disposed propeller shaft connecting said gear drive units, the extent of lateral offset between said gear units and the extent of longitudinal offset between said motor and said driving axle structure being such as to minimize the tilting of said diagonal propeller shaft upon relative movement of said vehicle chassis and said driving axle structure.

6. In a motor vehicle, a pair of transversely spaced road wheels, a driving axle unit including a differential located on the longitudinal center line of the vehicle and a pair of drive shafts extending outwardly from the centrally located differential to said road wheels, an engine unit of an over-all length greater than the space between said wheels, means mounting said engine unit in longitudinally spaced relation with said wheels and with its power shaft substantially parallel with said axle shafts, and a propeller shaft extending at an acute lateral angle for drive connecting said units.

7. In a motor vehicle, a pair of traversely spaced road wheels, a driving axle unit including a differential located on the longitudinal center line of the vehicle and a pair of drive shafts extending outwardly from the centrally located differential to said road wheels, an engine unit of an over-all length greater than the space between said wheels, means mounting said engine unit in longitudinally spaced relation with said wheels and with its power shaft substantially parallel with said axle shafts, variable speed gearing included in one of said units, a propeller shaft extending at an acute lateral angle and connecting the other of said units with the variable speed gearing, and a control device for the variable speed gearing.

8. The combination with a live axle having road wheels at opposite ends and a centrally disposed differential, a chassis frame adapted to be flexibly supported upon said axle through springs which allow relative movement between the axle and frame and a transversely disposed power plant carried by the frame beyond said wheels with its power output end disposed in longitudinal alinement with one of said wheels, of power transmission means between the relatively movable differential and power plant, including obliquely disposed line shafting, and universal joints in the shafting near opposite ends thereof adjacent the differential and the output end of the power plant respectively.

9. In a motor vehicle, a pair of transversely spaced road wheels on opposite sides of the vehicle, with differential drive mechanism therebetween, an engine unit disposed transversely of the vehicle in longitudinally spaced relation to said wheels and of a length greater than the space between said wheels with its power output end in longitudinal alinement with the wheel on one side of the vehicle, and a drive shaft extending at an acute lateral angle to the longitudinal center line of the vehicle and connecting the differential mechanism between the wheels with the power output end of the engine radially beyond one of the wheels.

DWIGHT E. AUSTIN.